J. FOLEY.
Water-Filter.
No. 201,102.      Patented March 12, 1878.
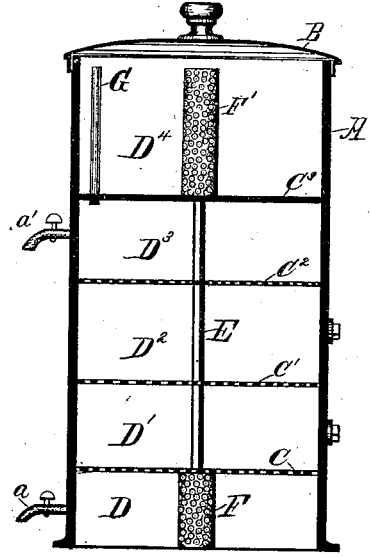
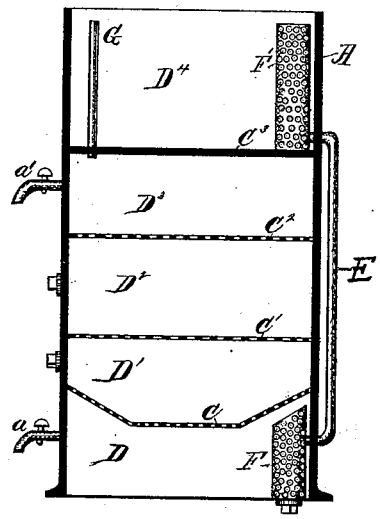

UNITED STATES PATENT OFFICE.

JAMES FOLEY, OF MONTREAL, QUEBEC, CANADA.

IMPROVEMENT IN WATER-FILTERS.

Specification forming part of Letters Patent No. 201,102, dated March 12, 1878; application filed August 27, 1877.

*To all whom it may concern:*

Be it known that I, JAMES FOLEY, of Montreal, in the Province of Quebec, Canada, have invented certain new and useful Improvements in Water-Filters; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a vertical section through my filter, and Fig. 2 is a similar view of the same in a modified form.

Corresponding parts in the two figures are denoted by like letters.

This invention relates to a certain improvement in that class of water-filters in which the filtering or purifying of the water is performed through upward pressure; and it consists, principally, of a tank or receptacle having perforated and imperforated partitions, and a tube communicating with and connecting the upper and lower unfiltered-water chambers together, and having attached to its ends perforated receptacles, substantially as hereinafter more fully set forth.

In the annexed drawing, A refers to a tank or receptacle suitably supported in a position, and having a removable cover, B, to permit of the filling of the tank. The tank or receptacle A is provided with perforated partitions C $C^1$ $C^2$ and imperforated partitions $C^3$, dividing the tank or receptacle into five compartments, D $D^1$ $D^2$ $D^3$ $D^4$. E is a tube, communicating with and connecting the unfiltered-water chambers D and $D^4$ together, and having its ends provided with perforated receptacles F F′, disposed in the said chambers D $D^4$. These perforated receptacles may be secured to the sides of the said chambers, and their connecting-pipe passed external to or outside of the tank, as seen in Fig. 2, instead of disposing them centrally, as in Fig. 1. As arranged in Fig. 2, the lower receptacle F′ may extend through or to the bottom of the tank, and be provided with a port or tap-screw for the removal and replacing of the filtering or purifying medium placed therein in cleansing the same.

The partition C, as shown in Fig. 2, may be dished or conoidal in form. The unfiltered-water chamber D is provided with a faucet or cock, $a$, for flushing or other purpose, and the filtered-water chamber $D^3$ with a faucet or cock, $a'$, for drawing off the water for drinking.

$D^1$ and $D^2$ are chambers for holding the filtering or purifying media, preferably animal charcoal and silica. G is an air-tube, communicating with the filtered-water chamber $D^3$, and reaching up into the upper unfiltered-water chamber $D^4$. The water placed or poured into the chamber $D^4$ passes through the perforated receptacle F′, and sponge or other filtering medium placed therein, down through the tube or pipe E, and out through the perforated receptacle F and its filtering medium (it likewise being supplied with sponge or other purifying medium) into the chamber D, whence it may be drawn off through the cock or faucet $a$ for other than drinking purposes. By keeping the cock $a$ closed the water will rise from the chamber D, in consequence of upward pressure produced by the weight of the column of water in the tube E, up through the perforated partitions C $C^1$ $C^2$ and the chambers $D^1$ $D^2$, and their purifying or filtering media, into the chamber $D^3$, whence it can be drawn off filtered through the faucet or cock $a'$ for drinking.

The filter or tank can be cleansed or flushed by allowing the cock $a'$ to remain closed, and the filtered water, which has risen into the chamber $D^3$, to return to the chamber D, and be drawn off by the faucet or cock $a$; or the same end may be attained by pouring water (hot water) into the air-tube G and opening the cock or faucet $a$.

The perforated receptacles F F′ may be covered with cotton or woolen fabric to prevent the entrance of coarse impurities. Ports or tap-screws are provided to the filtering or purifying chambers $D^1$ $D^2$, to permit of access thereto and the removal and replacing of the filtering or purifying media. By providing the chamber $D^4$ with a cock and connecting it to the service-pipe of the house, a large and constant supply of water can be obtained.

Having thus described my invention, what I claim, and desire to secure by Letters Patent, is—

1. In a water-filter, the tank or receptacle A, having the perforated partitions $C^1$ $C^2$ and imperforated partition $C^3$, in combination with the tube E, having the perforated receptacles F F', substantially as and for the purpose specified.

2. The tank or receptacle A, having perforated partitions C $C^1$ $C^2$ and imperforated partition $C^3$, in combination with tube E, having perforated receptacles F F', air-tube G, and faucets or cocks $a$ $a'$, substantially as and for the purpose set forth.

In testimony that I claim the foregoing as my own I hereunto affix my signature in presence of two witnesses.

JAMES FOLEY.

Witnesses:
  JAMES MCLEAN,
  C. CUSHING.